(12) United States Patent
Havlik et al.

(10) Patent No.: US 8,575,409 B2
(45) Date of Patent: Nov. 5, 2013

(54) METHOD FOR THE REMOVAL OF PHOSPHORUS

(75) Inventors: Peter Havlik, Tulsa, OK (US); Ramin Abhari, Bixby, OK (US); Gary Roth, Bristow, OK (US); H. Lynn Tomlinson, Tulsa, OK (US)

(73) Assignee: Syntroleum Corporation, Tulsa, OK (US)

( * ) Notice: Subject to any disclaimer, the term of this patent is extended or adjusted under 35 U.S.C. 154(b) by 0 days.

(21) Appl. No.: 13/243,353

(22) Filed: Sep. 23, 2011

(65) Prior Publication Data

US 2012/0251424 A1    Oct. 4, 2012

Related U.S. Application Data

(63) Continuation-in-part of application No. 11/961,501, filed on Dec. 20, 2007, now Pat. No. 8,026,401.

(51) Int. Cl.
*C07C 1/00* (2006.01)

(52) U.S. Cl.
USPC ........... 585/240; 585/638; 585/639; 585/733; 44/307; 44/308

(58) Field of Classification Search
USPC ............ 44/307–308; 585/240, 638, 639, 733; 208/57; 502/305, 321, 400, 414, 415
See application file for complete search history.

(56) References Cited

U.S. PATENT DOCUMENTS

| | | | |
|---|---|---|---|
| 2,093,159 A | 9/1937 | Schmidt | |
| 2,163,563 A | 6/1939 | Schrauth | |
| 2,915,447 A | 12/1959 | Arabian | |
| 3,144,404 A | 8/1964 | Tyson | |
| 3,496,099 A | 2/1970 | Bridge | |
| 4,049,686 A | 9/1977 | Ringers et al. | |
| 4,151,072 A | 4/1979 | Nowack et al. | |
| 4,233,140 A | 11/1980 | Antonelli et al. | |
| 4,252,634 A | 2/1981 | Khulbe et al. | |
| 4,300,009 A | 11/1981 | Haag et al. | |
| 4,431,524 A | 2/1984 | Norman | |

(Continued)

FOREIGN PATENT DOCUMENTS

| | | |
|---|---|---|
| CA | 1313200 | 1/1993 |
| CA | 2149685 | 9/1999 |

(Continued)

OTHER PUBLICATIONS

Wong, A., et al.; "Technical and Economic Aspects of Manufacturing Cetane-Enhanced Diesel Fuel from Canola Oil"; Bio-Oils Symposium, Saskatoon, Saskathewan, Canada; Mar. 2-3, 1994.

(Continued)

*Primary Examiner* — Brian McCaig
(74) *Attorney, Agent, or Firm* — Foley & Lardner LLP (57) ABSTRACT

A process for producing a hydrocarbon from biomass. A feed stream containing biomass having fatty acids, mono-, di-, and/or triglycerides, and a phosphorus content of between about 1 wppm and about 1,000 wppm is provided. A heated hydrocarbon solvent and a hydrogen-rich gas are provided. The feed stream, the heated hydrocarbon solvent, and the hydrogen-rich gas are combined in the presence of a low activity hydrogenation catalyst. A spent low activity hydrogenation catalyst is recovered at the end of a run wherein the spent low activity hydrogenation catalyst contains at least 3% by weight phosphorus.

22 Claims, 3 Drawing Sheets

(56) References Cited

U.S. PATENT DOCUMENTS

| | | |
|---|---|---|
| 4,432,865 A | 2/1984 | Norman |
| 4,512,878 A | 4/1985 | Reid et al. |
| 4,571,442 A | 2/1986 | Cosyns et al. |
| 4,698,185 A | 10/1987 | Dijkstra et al. |
| 4,734,226 A | 3/1988 | Parker et al. |
| 4,746,420 A | 5/1988 | Darian et al. |
| 4,937,051 A | 6/1990 | Graven et al. |
| 4,960,960 A | 10/1990 | Harrison et al. |
| 4,992,605 A | 2/1991 | Craig et al. |
| 5,093,535 A | 3/1992 | Harrison et al. |
| 5,105,015 A | 4/1992 | Lin et al. |
| 5,135,638 A | 8/1992 | Miller |
| 5,239,096 A | 8/1993 | Rohdenburg et al. |
| 5,292,428 A | 3/1994 | Harrison et al. |
| 5,298,639 A | 3/1994 | Toeneboehn et al. |
| 5,475,160 A | 12/1995 | Singleton et al. |
| 5,502,077 A | 3/1996 | Breivik et al. |
| 5,578,090 A | 11/1996 | Bradin |
| 5,647,226 A | 7/1997 | Scaringe et al. |
| 5,705,722 A | 1/1998 | Monnier et al. |
| 5,851,338 A | 12/1998 | Pushaw |
| 5,877,358 A | 3/1999 | Garton et al. |
| 5,882,505 A | 3/1999 | Wittenbrink et al. |
| 5,906,729 A | 5/1999 | Chou |
| 6,123,835 A | 9/2000 | Ackerson et al. |
| 6,185,742 B1 | 2/2001 | Doherty |
| 6,190,535 B1 | 2/2001 | Kalnes et al. |
| 6,203,695 B1 | 3/2001 | Harle et al. |
| 6,402,935 B1 | 6/2002 | Kalnes |
| 6,574,971 B2 | 6/2003 | Suppes |
| 6,638,418 B1 | 10/2003 | Kalnes et al. |
| 6,660,812 B2 | 12/2003 | Kuechler et al. |
| 6,846,778 B2 | 1/2005 | Johnson et al. |
| 6,855,410 B2 | 2/2005 | Buckley |
| 7,232,935 B2 | 6/2007 | Jakkula et al. |
| 7,288,685 B2 | 10/2007 | Marker |
| 7,511,181 B2 | 3/2009 | Petri et al. |
| 7,550,634 B2 | 6/2009 | Yao et al. |
| 7,691,159 B2 | 4/2010 | Li |
| 7,718,051 B2 | 5/2010 | Ginosar et al. |
| 7,754,931 B2 | 7/2010 | Monnier et al. |
| 7,816,570 B2 | 10/2010 | Roberts et al. |
| 7,836,722 B2 | 11/2010 | Magill et al. |
| 7,846,323 B2 | 12/2010 | Abhari et al. |
| 7,928,273 B2 | 4/2011 | Bradin |
| 7,968,757 B2 | 6/2011 | Abhari et al. |
| 7,982,076 B2 | 7/2011 | Marker et al. |
| 8,003,836 B2 | 8/2011 | Marker et al. |
| 8,026,401 B2 | 9/2011 | Abhari et al. |
| 8,187,344 B2 | 5/2012 | Jakkula et al. |
| 8,212,094 B2 | 7/2012 | Myllyoja et al. |
| 8,278,492 B2 | 10/2012 | Myllyoja et al. |
| 2004/0055209 A1 | 3/2004 | Jakkula et al. |
| 2004/0067856 A1 | 4/2004 | Johnson et al. |
| 2004/0230085 A1 | 11/2004 | Jakkula et al. |
| 2005/0150815 A1 | 7/2005 | Johnson et al. |
| 2006/0161032 A1 | 7/2006 | Murzin et al. |
| 2006/0186020 A1 | 8/2006 | Gomes |
| 2006/0199984 A1 | 9/2006 | Kuechler et al. |
| 2006/0207166 A1 | 9/2006 | Herskowitz et al. |
| 2006/0264684 A1 | 11/2006 | Petri et al. |
| 2007/0006523 A1 | 1/2007 | Myllyoja et al. |
| 2007/0010682 A1 | 1/2007 | Myllyoja et al. |
| 2007/0026012 A1 | 2/2007 | DeLisa et al. |
| 2007/0131579 A1 | 6/2007 | Koivusalmi et al. |
| 2007/0161832 A1 | 7/2007 | Myllyoja et al. |
| 2007/0170091 A1 | 7/2007 | Monnier et al. |
| 2007/0260102 A1 | 11/2007 | Duarte Santiago et al. |
| 2008/0308458 A1* | 12/2008 | Dindi et al. ............ 208/137 |
| 2008/0312480 A1 | 12/2008 | Dindi et al. |
| 2009/0077866 A1 | 3/2009 | Kalnes et al. |
| 2010/0076238 A1 | 3/2010 | Brandvold et al. |
| 2011/0138680 A1* | 6/2011 | Dandeu et al. ............ 44/307 |
| 2012/0029250 A1* | 2/2012 | Hallen et al. ............ 568/858 |

FOREIGN PATENT DOCUMENTS

| | | |
|---|---|---|
| CZ | 283575 | 5/1998 |
| DE | 41 16 905 | 8/1992 |
| EP | 0 794 241 | 3/1997 |
| EP | 1 728 844 | 12/2006 |
| EP | 1728844 | 12/2006 |
| FI | 72435 | 2/1987 |
| FI | 73367 | 6/1987 |
| FI | 89073 | 4/1993 |
| FI | 95391 | 1/1996 |
| GB | 2 090 611 | 7/1982 |
| GB | 2 494 293 | 3/2013 |
| IE | 921671 | 12/1995 |
| JP | 59-108088 | 6/1984 |
| SE | 9700149 | 8/1997 |
| SE | 520633 | 8/2003 |
| WO | 0011117 | 3/2000 |
| WO | WO-00/11117 | 3/2000 |
| WO | WO-01/49812 | 7/2001 |
| WO | WO-03/022960 | 3/2003 |
| WO | 2004104142 | 12/2004 |
| WO | WO-2004/104142 | 12/2004 |
| WO | 2005026297 | 3/2005 |
| WO | WO-2005/026297 | 3/2005 |
| WO | 2007068795 | 6/2007 |
| WO | WO-2007/063874 | 6/2007 |
| WO | WO-2007/068795 | 6/2007 |
| WO | WO-2008/054442 | 5/2008 |
| WO | WO-2008/058664 | 5/2008 |
| WO | WO-2008/067627 | 6/2008 |
| WO | WO-2009/085686 | 7/2009 |
| WO | WO-2009/151692 | 12/2009 |

OTHER PUBLICATIONS

Sharma, S.D., et al.; "Latent Heat Storage Materials and Systems: A Review"; International Journal of Green Energy; 2: 1-56; 2005.

U.S. Appl. No. 60/934,710.

PCT/US2008/086805; International Preliminary Report on Patentability and Written Opinion; Jul. 1, 2010 (date of mailing); 7 pages.

Abhari et al., "New Routes to Ethylene," EEPC Seminar in Berlin, Germany, Oct. 20-22, 2010, pp. 1-38.

Ali et al., "Fuel Properties of Tallow and Soybead Oil Esters," JAOCS, 1995, vol. 72, No. 12.

Antoniassi, R. et al, "Pretreatment of Corn Oil for Physical Refining," JAOCS, vol. 75, No. 10, 1998, pp. 1411-1415.

Arroyo et al., "Hydrocracking and isomerization of n-paraffin mixtures and a hydrotreated gasoil on Pt/ZSM-22: confirmation of pore mouth and key013lock catalysis in liquid phase," Applied Catalysis A: General 192, 2000, pp. 9-22.

ASTM International, "Standard Specification for Diesel Fuel Oil", Designation: D975-12, printed Nov. 9, 2012, 26 pages.

Batts et al., "A Literature Review on Fuel Stability Studies with Particular Emphasis on Diesel Oil", Energy & Fuels, 1991, vol. 5, pp. 2-21.

Beare-Rogers, J. et al, "Lexicon of Lipid Nutrition," Pure and Applied Chemistry, vol. 73, No. 4, 2001, pp. 685-744.

Bergerioux, C. et al, "Determination of Trace Element Pathways in a Petroleum Distillation Unit by Instrumental Neutron Activation Analysis," Journal of Radioanalytical Chemistry, vol. 54, No. 1-2, 1979, pp. 255-265.

Burch et al., "Melting-Point Models of Alkanes", J. Chem. Eng. Data 2004, 49, 858-863.

Canada Centre for Mineral and Energy Technology, "New Process Yields Cleaner Diesel", Canmet'95: New Directions, 1995, p. 14.

Canakci et al., "Biodiesel Production from Oils and Fats with High Free Fatty Acids", Transactions of the ASAE, 2001, vol. 44(6), pp. 1429-1436.

Clements, L.D., "Blending Rules for Formulating Biodiesel Fluid.", Proceedings of the Third Liquid Fuels Conference, Sep. 15-17, 1996, pp. 44-53.

Cmolik et al., "Effects of plant-scale alkali refining and physical refining on the quality of rapeseed oil", Eur. J. Lipod Sci. Technol. 2000, 15-22.

(56) References Cited

OTHER PUBLICATIONS

Cooper et al., "Production of Swedish Class I Diesel Using Dual-Stage Process", Catalytic Hydroprocessing of Petroleum and Distillates, based on Proceedings of the AIChE Spring National Meeting, Houston, Texas, Mar. 28-Apr. 1, 1993, 279-290.
Corma, et al., "Transformation of Alkanes on Solid Acid and Bifunctional Catalysts", Catalytic Activation and Functionalisation of Light Alkanes: Advances and Challenges, Editors E.G. Derouane et al., 1998, Netherlands: Kluwer Academic Publishers, vol. 44, pp. 35-74.
Criterion, "Technical Bulletin: Criterion* Hydrotreating Catalyst In-Situ Presulphiding Guidelines—Liquid Phase (Preferred method)—Gase Phase (alternative method)" Criterion Catalysts, Aug. 1998, 1-9.
Deem, A.G. et al, "Catalytic Poisoning in Liquid-Phase Hydrogenation," Industrial and Engineering Chemistry, vol. 33, No. 11, Nov. 1941, pp. 1373-1376.
Del Gallo et. al. "Comparison of the Effects of Nitrogen Poisoning on Molybdenum Oxycarbide and Pt/B-Zeolite Catalysts in the Isomerization of n-Heptane," Ind. Eng. Chem. Res., 1996, vol. 35, No. 10, pp. 3302-3310.
Derrien et al., "The IFP Selective Hydrogenation Process", Chemical Engineering Process, vol. 70, No. 1, Jan. 1974, 74-80.
Dynamic Fuels, "About", http://www.dynamicfuelsllc.com/. Accessed Nov. 12, 2012, 8 pages.
Dynamic Fuels, "Compare", http://www.dynamicfuelsllc.com/. Accessed Nov. 12, 2012, 7 pages.
Dynamic Fuels, "Frequently Ask Questions," http://dynamicfuelsllc.com/wpnews/frequently-ask-questions/, Accessed Nov. 12, 2012, 4 pages.
Edgar et al., "Analysis is key to hydrotreater troubleshooting", Oil & Gas Journal, vol. 82, issue 23, Jun. 4, 1984, 67-70.
Egeberg et al., "Hydrotreating in the Production of Green Diesel," Digital Refining, Apr. 2010, 13 pages; Available for download at http://www.digitalrefining.com/article/1000156,Hydrotreating_in_the_production_of_green_diesel.html#.UcSCEKybWVo.
Egeberg et al., "Novel Hydrotreating Technology for Production of Green Diesel," 14th European Refining Technology Conference, Berlin, Germany, Nov. 9-11, 2009, 21 pages.
Erickson et al., "Soybead Oil Modern Processing and Utilization", American Soybean Association, 1990, 20 pages.
Feng et al., "Chemical Composition of Tall-Oil Based Cetane Enhancer for Diesel Fuels", First Biomass Conference of The Americas: Engergy, Environment, Agriculture, and Industry, Aug. 30 -Sep. 2, 1993. 14 pages.
Filho et al., Catalytic Conversion of *Hevea brasiliensis* and *Virola sebifera* Oils to Hydrocarbon Fuels, JAOCS, vol. 69, No. 3, Mar. 1992, 266-271.
Galeana et al., "Thermodynamics of Wax Precipitation in Petroleum Mixtures," AIChE Journal, 1996, vol. 42, No. 1, pp. 239-248.
Galperin, "Hydroisomerization of N-decane in the presence of sulfur and nitrogen compounds," Applied Catalysis A: General, 209, 2001 pp. 257-268.
Garrido et al., "Concentrations of Metal in vegetable edible oils", Food Chemistry, vol. 50, 1994, 237-243.
Goering et al., "Fuel Properties of Eleven Vegetable Oils," Transactions of the ASAE, 1982, pp. 1472-1477, 1483.
Goodrum et al., "Rheological Characterization of Yellow Grease and Poultry Fat," JAOCS, 2002, vol. 79, No. 10, pp. 961-964.
Groschen, R., "Overview of: The Feasibility of Biodiesel from Waste/Recycled Greases and Animal Fats", Marketing Services Division, Minnesota Department of Agriculture, Oct. 2002, 28 pages.
Gusmao et al., "Utilization of Vegetable Oils as an Alternative Source for Diesel-Type Fuel," Catalysis Today, 5, 1989, pp. 533-544.
Herrera et al., "Catalyst Selection for Hydrotreating Diesel Fuel from Residue Hydrocracking", ACS Preprints, 1992, vol. 37, No. 4, pp. 1855-1863.
Hill, C., An Introduction to Chemical Engineering Kinetics & Reactor Design, John Wiley & Sons, Inc., 1977, pp. 349-380, 382-387.

Iki, et al., "Applicability of Hydrogenated Palm Oil for Automotive Fuels", 16th Saudi Arabia-Japen Joint Symposium, Dhahran, Saudi Arabia, Nov. 5-6, 2006, 10 pages.
Kalnes, et al.; U.S. Appl. No. 60/973,788, entitled "Production of Diesel Fuel from Biorenewable Feedstocks", filed Sep. 9, 2007.
Kent, J., "Table 8.2", Riegel's Handbook of Industrial Chemistry, 9th Edition, 1992, pp. 278-279.
Kirk-Othmer, "Gravity Concentration to Hydrogen Energy", Encyclopedia of Chemical Technology, Third Edition, vol. 12, Copyright 1980 by John Wiley & Sons, Inc., 931-937.
Kriz, et al., "Catalysts for the Isomerization of C7 Paraffins," Ind. Eng. Chem. Res., 1998, 37:4560-4569.
Levenspiel, O., Chemical Reaction Engineering, Third Edition, John Wiley & Sons, Inc., 1999, pp. 207-239.
Lewis, R.J., Hawley's Condensed Chemical Dictionary, 12th Edition, 1993, p. 907.
Long et al., "Noble Metal (Pt, Rh, Pd) Promoted Fe-ZSM-5 for Selective Catalytic Oxidation of Ammonia to N2 at Low Temperatures", Catalysis Letters, Mar. 2002, vol. 78, Nos. 1-4, pp. 353-357.
MacDonald, "Fuel From Fats," enerG Alternative Sources Magazine, Sep./Oct. 2011, 4 pages.
Mag, T., "Canola Seed and Oil Processing", Canola Council of Canada, 1994, 6 pages.
Mansfield Fuels, "Norfolk Southern Pens Deal with Dynamic Fuels and Mansfield Oil", http://www.mansfieldoil.com/latest-news-a-press/524-norfolk-southern-pens-deal-with-dynamic-fueis-and-mansfield-oil.html, Accessed Nov. 12, 2012, 2 pages.
Miller, "Studies on Wax Isomerization for Lubes and Fuels, Zeolited and Related Microporous Materials: State of the Art in 1994," Studies in Surface Science and Catalysts, 1994, vol. 84, pp. 2319-2326.
Mirante et al., "Cloud point prediction of fuels and fuel blends," Fluid Phase Equilibria 180, 2001, pp. 247-255.
Moyse, "Graded Catalyst Systems to Combat Bed-Fouling Problems", Haldor Topsoe, Inc. 1996, 16 pages.
Plantenga et al., "Specialized guard-bed technology can improve resid unit operation", Oil & Gas Journal, Oct. 21, 1991, 74-78.
Pope et al., "A Study of Catalyst Formulations for Isomerization of C7 Hydrocarbons", Applied Catalysis A: General 233, 2002, pp. 45-62.
Prakash, "A Critical Review of Biodiesel As a Transportation Fuel in Canada", Mar. 25, 1998, 163 pages.
Proctor & Gamble, "Better Rendering, A Manual Prepared by Proctor & Gamble", 2nd Ed., 1967, pp. ix-xi, 1-21.
Przybylski,R., "Canola Oil: Physical and Chemical Properties", Canola Council of Canada, 1998, 12 pages.
Rahimi et al., "Effect of Hydrotreating on the Stability of Synthetic Crude from Western Canada," Symposium on Stability and Oxidation Chemistry of Fuels, Dallas, Spring 1998, ACS Fuels 43 (1), pp. 13-17; Available for download at http://web.anl.gov/PCS/acsfuel/preprint%20archive/43_1_DALLAS_03-98.htm.
Sanford et al., "Improved Catalyst Loading Reduces Guard Reactor Fouling", Oil & Gas Journal, Dec. 19, 1988, pp. 35-41.
Smejkal, et al., "Thermodynamic balance in reaction system of total vegetable oil hydrogenation", Chemical Engineering Journal 146 (2009) 155-160.
Sharma, S.D., et al.; "Latent Heat Storage Materials and Systems: A Review"; International Journal of Green Energy; 2:1-56; 2005.
Simacek, et al., "Hydroprocessed rapeseed oil as a source of hydrocarbon-based biodiesel", Fuel 88, 2009, 456-460.
Soveran et al., "The Effect on Diesel Engine Emissions with High Cetane Additives From Biomass Oils," Proc. American Chemical Society (Division of Fuel Chemistry) Meeting San Francisco, CA, Apr. 1992, pp. 74-85.
Spataru, "AGTANE (AGricultural ceTANE): An Economically Viable Bioenergy Product for Compression Ignited Engines", Fuel Chemistry Division Preprints, 2002, vol. 47(1), p. 365.
Spataru, "Is There a Future for Yellow Grease as a Fuel Additive?," Render, Feb. 2001, pp. 12-14.
Spataru, et al., "AGTANE (AGricultural ceTANE): An economically viable bioenergy product for compression ignited engines," 5th International Biomass Conference of the Americas Sep. 21, 2001, 2 pages.

(56) References Cited

OTHER PUBLICATIONS

Stork, W.H.J., "Molecules, catalysts and reactors in hydroprocessing of oil fractions", Hydrotreatment and Hydrocracking of oil fractions, 1997 Elsevier Science B.V., 41-67.

Stumborg et al., "Hydroprocessed Vegetable Oils for Diesel Fuel Improvement." Bioresources Technology, 1996, vol. 56, pp. 13-18.

Syntroleum webpage, "Bio-Synfining—Dynamic Fuels Plant"; http://www.b2i.us/profiles/investor/fullpage.asp?BzID=2029&to=cp&Nav=O&LangID=1&s=0&ID=11923, Accessed Nov. 21, 2012, 4 pages.

Table 4a. U.S. Crude Oil and Liquid Fuels Supply, Consumption and Inventories, Dec. 2012, 1 pp.

Taylor et al., Modern Advanced Control Pays Back Rapidly, Hydrocarbon Processing, Sep. 2000 issue, pp. 47-50.

Tyson et al., "Biomass Oil Analysis: Research needs and Recommendations," NREL Technical Report, Jun. 2004, 116 pages.

U.S. Dept. of Agriculture—Oilseeds: World Markets and Trade, "Soybean Oil and Palm Oil Account for an Increasing Share of Word Vegetable Oil Consumption", (2003), 27 pages.

U.S. Natural Gas Wellhead Price data and graph from U.S. Energy Information Administration, released Nov. 30, 2012, 1 pp; Available for download at http://www.eia.gov/dnav/ng/ng_pri_sum_dcu_nus_m.htm.

Vajo, et al., "Steady-State Decomposition of Ammonia on the Pt(110)-(1×2) Surface", The Journal of Physical Chemistry, 1986, vol. 90, No. 24, pp. 6531-6535.

Wong et al., "Conversion of Vegetable Oils and Animal Fats Into Paraffinic Cetane Enhancers for Diesel Fuels," Second Biomass Conference of the Americas: Energy, Environment, Agriculture, and Industry, 1995, pp. 901-910.

Wong, A., et al.; "Technical and Economic Aspects of Manufacturing Cetane-Enhanced Diesel Fuel from Canola Oil"; Bio-Oils Symposium; Saskatoon, Saskatchewan, Canada; Mar. 2-3, 1994.

Doty, D.M. (1971). "Removal of Polyethylene and Other Polymeric Materials from Rendered Animal Fat." The Director's Digest, Fats and Proteins Research Foundation, Inc., 90, 4 pgs.

Non-Final Office Action in U.S. Appl. No. 13/867,857 dtd Jul. 8, 2013.

* cited by examiner

METHOD FOR THE REMOVAL OF PHOSPHORUS

CROSS-REFERENCE TO RELATED APPLICATIONS

The present application is a continuation-in-part of U.S. patent application Ser. No. 11/961,501, now U.S. Pat. No. 8,026,401, filed on Dec. 20, 2007, entitled "Hydrodeoxygenation Process", the entire contents of which are incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to a process for converting biorenewable feedstocks into fuel, and more particularly, not by way of limitation, to a process for removing phosphorus from biorenewable feedstocks, such as vegetable oils, animal fats, and other sources of fatty acids/glycerides, while converting biorenewable feedstocks into fuel and chemical products and intermediates. The inventive method may be adapted to recover the removed phosphorus.

2. Brief Description of the Related Art

Biomass is a renewable alternative to fossil raw materials in production of liquid fuels and chemicals. Increase of biofuels production is part of the government's strategy to improve energy security and reduce green house gas emissions. However, most biomass has high oxygen content which lowers fuel quality and heat value. Upgrading biomass or biomass intermediates into high quality hydrocarbon fuels thus requires removal of oxygen. The biomass oxygen may be in the form of an ester, carboxylic acid or hydroxyl groups.

Removal of oxygen by catalytic reaction with hydrogen is referred to as hydrodeoxygenation (HDO). This reaction may be conducted with conventional fixed-bed bimetallic hydrotreating catalysts such as sulfided nickel-molybdenum (NiMo) or cobalt-molybdenum (CoMo) which are commonly used in refineries.

Unrefined vegetable oils and animal fats have several hundred ppm phosphorus in the form of phospholipids. Phosphorus is a key nutrient for plants and the animal life they support. Fertilizers contain phosphorus (in phosphate form) to maintain soil nutrition and support growth. In an isolated ecosystem, such as a forest, the phosphorus taken from the soil to nourish the growing vegetation releases back into the soil after decomposition of dead plants. However, in societies dependent on modern agriculture, the phosphorus cycle is not closed.

Phosphorus, mined from rocks, is converted to fertilizers. The fertilizer is added to the soil and converted into the growing plant's cellular makeup. The plant is eaten by animals and humans alike and, what is not incorporated into the body to support growth (bone, cell membranes, etc.), is washed away in urine, feces, and fertilizer runoff. Phosphorus, thus, leaves the soil and ultimately ends up in water ways where it has a negative impact on aquatic ecosystems.

Phosphorus discharged to water systems contributes to algal blooms. Algae from this type of phosphate discharge grow rapidly, cover wide sections of the water system, and then die. As the algae decompose, they consume the water system's oxygen, starving fish and native plant life. The flow of phosphorus from mine to water systems, where it remains essentially unrecoverable, has raised questions about sustainability of our modern agricultural practices. In an article entitled "Peak Phosphorus" which appeared in the April 2010 issue of Foreign Policy, James Elser and Stuart White warn of depleting phosphorus mines, and discuss the significance of America's transition from a major phosphorus exporter to a country that needs to import more than 10% of its phosphorus today.

The emerging biofuel industry is expected to increase phosphorus demand and potentially aggravate the situation. For example, algae, the touted green crude of the future, need phosphorus to live up to their potential as high oil yielding energy crops.

Biofuels themselves need to be devoid of phosphorus since the latter tends to form harmful deposits on engine parts. The ASTM D6751 standard for biodiesel sets a maximum specification limit of 0.001 wt % for phosphorus. A similar low phosphorus requirement exists for most bio-based chemicals (e.g. oleochemicals).

Phosphorus in vegetable oils and animal fats is mainly in the form of phospholipids. This class of compounds is characterized by a diglyceride, a phosphate group, and a simple organic molecule such as choline. Phospholipids are a key component of most vegetable oils and animal fats. Crude soybean oil, for example, can contain up to 2.5% phospholipid.

Removal of phosphorus from vegetable oils is referred to as degumming. Degumming typically involves contacting the oil with phosphoric and/or citric acid followed by separation of the resulting solids/sludge. Typically, a high-shear mixing device is used to achieve efficient contact between the aqueous acid phase and the oil phase. Solids comprising phospholipid and phosphate/citrate salts of calcium/magnesium (also present in crude vegetable oils and animal fats) are thus formed and allowed to grow via flocculation in a holding/residence tank. Centrifugation is commonly used in the subsequent step to separate the phosphorus-rich solids/sludge from the degummed oil.

An alternative to the aforementioned acid degumming process is physical degumming or dry degumming. This involves adsorption of polar compounds (including phospholipids and soaps) on active clay. Both natural (e.g. Fuller's earth) and synthetic (e.g. Grace Davison's TriSyl® clays may be used. The physical degumming process typically involves injection of the powder clay into an agitated slurry tank. The spent clay—containing adsorbed phosphorus and metal compounds—is then separated using a pressure leaf filter. The dry degumming process is also referred to as "bleaching" since the active clay removes color bodies in addition to phosphorus and metals.

Most modern vegetable oil refining processes use both chemical and physical degumming to produce Refined, Bleached, and Degummed (RBD) products. RBD grade vegetable oils are characterized by their low phosphorus and metals content, good shelf life, and light color. Such vegetable oils are the preferred feedstock for biofuels produced by transesterification and hydroprocessing.

Hydroprocessing—specifically hydrodeoxygenation followed by hydroisomerization—is considered to be a more attractive method for production of bio-based diesel and jet fuel than transesterification. (Diesel from hydroprocessing of fats and oils is referred to as "renewable diesel" and "green diesel" to distinguish it from fatty acid alkyl ester "biodiesel.") Transesterification produces alkyl esters, which are absent in crude oil and therefore do not meet fuel specifications developed for petroleum fuels. As such, alkyl esters are only marketed as fuel additives or blendstock. On the other hand, hydroprocessing produces bio-based hydrocarbons that represent the most desirable molecules found in petroleum diesel and jet fuel—namely n-paraffins and iso-paraffins. These hydrocarbons are considered desirable for diesel because of their clean burning properties (low particulate matter emissions and engine deposits) and high cetane values. The conversion of fatty acids to n-paraffins is given by Eqs 1 and 2 for the illustrative case of oleic acid conversion to n-octadecane and n-heptadecane.

$$\mathrm{HOOC}-\mathrm{C}_{17}\mathrm{H}_{33}+2\mathrm{H}_2\rightarrow n\text{-}\mathrm{C}_{18}\mathrm{H}_{38}+2\mathrm{H}_2\mathrm{O} \tag{1}$$

$$\mathrm{HOOC}-\mathrm{C}_{17}\mathrm{H}_{33}+\mathrm{H}_2\rightarrow n\text{-}\mathrm{C}_{17}\mathrm{H}_{36}+\mathrm{CO}_2 \tag{2}$$

In the case of mono-, di-, and tri-glycerides, the glycerol backbone is converted to propane. Hydroisomerization converts the straight-chain n-paraffin to branched iso-paraffins that have better low temperature properties (e.g. lower cloud point). Renewable diesel is thus considered a "second generation" or a "drop-in" biofuel.

Hydroprocessing catalysts typically include one or more base metals or noble metals supported on an alumina- and/or silica-containing support. These catalysts are designed to achieve one or more of the following hydrogenation and hydrogenolysis reactions: deoxygenation, desulfurization, denitrogenation, demetalation, hydrocracking, hydroisomerization, and saturation of double bonds. The catalyst is typically in the form of extrudates, shaped-extrudates (three- or four-lobed extrudates), Raschig rings, or shaped tablets, for fixed-bed reactors, or in powder form for slurry reactor systems. Once the hydroprocessing catalyst is deactivated or fouled such that it cannot achieve the desired conversion/ throughput, it is discharged from the reactor. In most cases, this spent catalyst is then sent for catalyst regeneration/reactivation or metals recovery. The regeneration/reactivation and metals recovery process generally includes a pyrolysis step, where hydrocarbons are volatilized in the absence of oxygen, and a decoking step where the carbon deposited on the catalyst is burned off under a controlled oxygen atmosphere.

The phosphorus removed during conventional degumming operations is incorporated into waste streams—sludge from acid degumming and spent clay from physical degumming. Since there is nothing to "reclaim," the sludge and spent clay are commonly land-filled. As such, the prior art offers no opportunity for recovery of phosphorus removed from vegetable oils and fats.

To this end, there is a need for a process that can trap phosphorus during conversion of fats and oils to biofuels and bio-based chemicals, such that the trapped phosphorus can economically be recovered for reuse (e.g. as fertilizer). It is to such a process that the present invention is directed.

SUMMARY OF THE INVENTION

In general, the present invention is a method for the production of hydroprocessed biofuels, such as renewable diesel and jet fuel, and bio-based products, such as solvents and chemical intermediates. The present invention is directed to a method for the removal and capture of phosphorus from fats and oils as described herein. An embodiment of the disclosed method includes (a) heating a diluent/solvent, (b) combining the fat/oil feedstock with the diluent/solvent, (c) subjecting the diluted/dissolved feedstock to hydroprocessing conditions with a catalyst having high pore volume and low hydrogenation activity, (d) trapping phosphorus in the catalyst, and (e) further converting the catalytic reaction product and recovering biofuel or bio-based chemical from the reactor effluent. At the end of the catalyst utilization cycle, the catalyst may be sent out for regeneration/reactivation, metals reclamation, and phosphorus recovery.

The hydroprocessing conditions include hydrogen partial pressures between about 400 psi and about 4000 psi, and temperatures between about 400° F. and about 750° F. The high pore volume catalyst is preferably a low hydrogenation activity base metal catalyst including molybdenum or tungsten. The catalysts have a phosphorus pickup/capture capacity of at least 3% by weight (wt phosphorus/wt spent catalyst), most preferably at least 6% by weight.

The present invention is directed to a method for producing hydrocarbons from biomass. A feed stream containing biomass having fatty acids, mono-, di-, and/or triglycerides, and a phosphorus content of about 10 wppm to about 1,000 wppm is provided. The feed stream is selected from the group comprising animal fats, poultry oil, soybean oil, canola oil, rapeseed oils, palm oil, palm kernel oil, jatropha oil, castor oil, camelina oil, algae oil, seaweed oil, halophile oils, rendered fats, restaurant greases, brown grease, yellow grease, waste industrial frying oils, fish oils, and tall oil. A heated hydrocarbon solvent is provided. The heated hydrocarbon solvent is between about 550° F. to about 750° F. and is provided from the hydrocarbons produced from biomass. Hydrogen-rich gas is provided. The feed stream, the heated hydrocarbon solvent, and the hydrogen-rich gas are combined in the presence of a low activity hydrogenation catalyst. The low activity hydrogenation catalyst is a sulfided mono-metallic base metal catalyst. The low activity hydrogenation catalyst contains between about 2% and about 10% molybdenum or tungsten. A spent low activity hydrogenation catalyst is recovered at the end of run wherein the spent low activity hydrogenation catalyst contains at least 3% by weight phosphorus, preferably at least 6% by weight phosphorus, and most preferably at least 9% by weight phosphorus. Phosphorus is recovered from the spent low activity hydrogenation catalyst. The phosphorus is recovered in a furnace under catalyst decoking conditions. The low activity hydrogenation catalyst may be regenerated and reused after phosphorus recovery and catalyst decoking.

In another embodiment, the feed stream, the heated hydrocarbon solvent, and the hydrogen-rich gas are combined in the presence of a high activity hydrogenation catalyst. The high activity hydrogenation catalyst is a bimetallic base metal catalyst. The high activity hydrogenation catalyst contains at least 16% total metals from the group comprising nickel, cobalt, molybdenum, and tungsten.

The hydrocarbons include n-paraffins in the $C_{11}$ to $C_{24}$ range. The hydrocarbons are hydroisomerized and the hydroisomerized hydrocarbons include renewable diesel. The hydrocarbons are fractionated into products comprising chemical intermediates, fluids, and solvents.

DETAILED DESCRIPTION OF THE INVENTION

Figure 1:
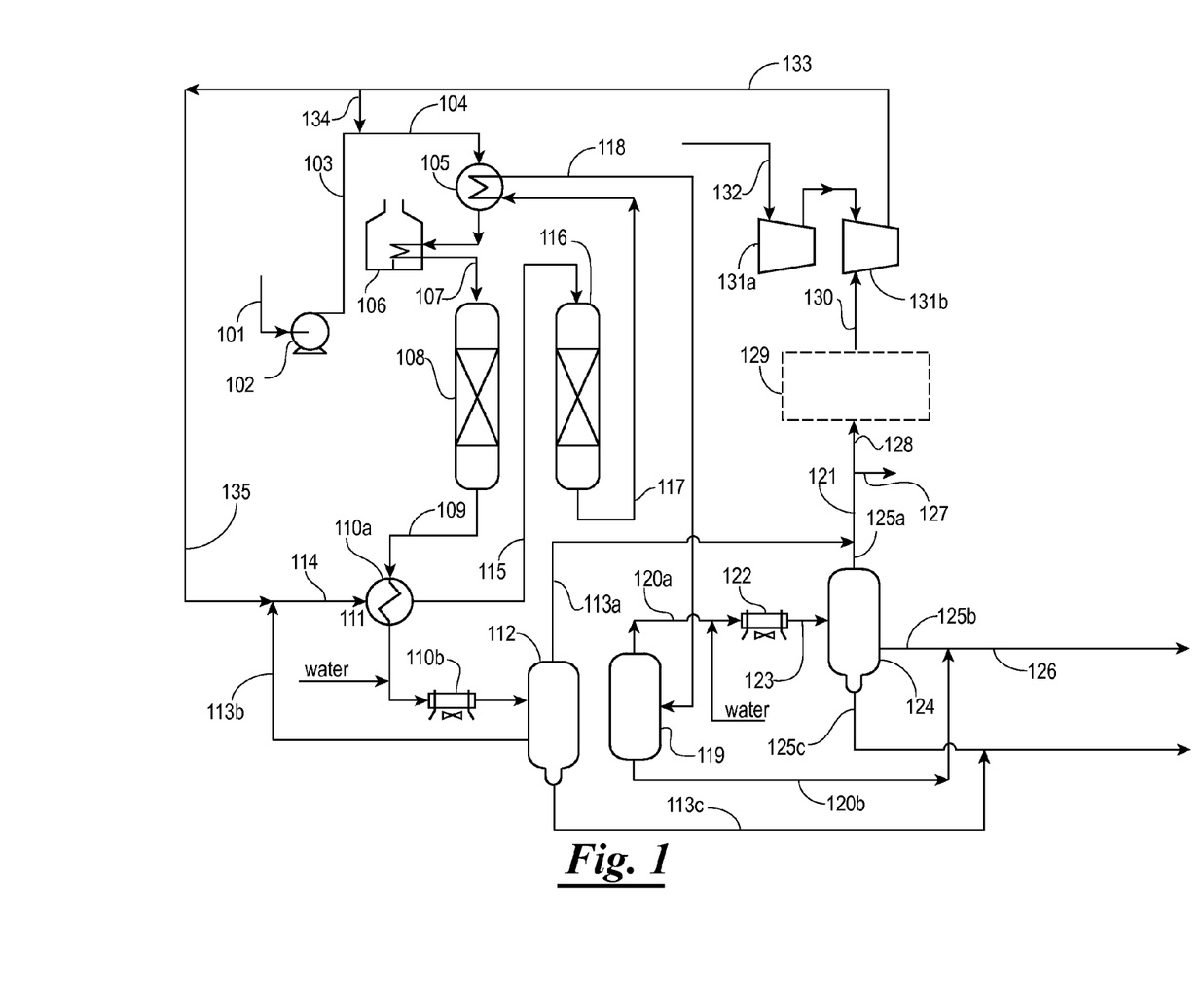
FIG. 1 is a schematic diagram of an operation of a hydrodeoxygenation process according to the present invention.

Referring now to the drawings, and more particularly to FIG. 1, shown therein is a schematic of the operation of the process in accordance with the present invention as described herein. A biofeed 101, containing fatty acids and/or fatty acid esters, is pressurized to between about 1,200-1,800 psig using pump 102. A pressurized biofeed 103 is combined with a recycled hydrogen stream 134 (compressed to the same pressure) such that a combined reactor feed 104 is heated through a feed-effluent heat exchanger 105 before further heating to the desired reactor inlet temperature of between about 600-650° F. in heater 106. A preheated feed stream 107 enters a first stage HDO reactor 108. The first stage HDO reactor 108 is packed with a high pore capacity alumina impregnated with a low activity hydrogenation metal. In addition to alumina, silica, aluminum phosphate, and combinations of these, may also be used. Suitable active metals for this type of catalyst include molybdenum, chromium, tungsten, copper, and others from Group VIIB, VIIB, and IB of the periodic table, as fully reduced metal or metal sulfide. Since the first stage HDO reactor 108 acts as a "guard reactor" for a second stage HDO reactor, provisions for mitigating fouling are made by using larger-size, high-void catalysts. One example of a catalyst that may be used in the first stage HDO reactor 108 is TK-709, commercially available from Haldor Topsoe. The reaction which occurs in the first stage HDO reactor 108 converts the fatty acids to paraffin (Equation (4)), while cracking the triglycerides into fatty alcohols and smaller esters (Equation (3)).

The effluent 109 of the first stage HDO reactor 108 is cooled through a feed-effluent heat exchanger 110a. A cooled stream 111 contains hydrocarbons, fatty alcohols, and esters in liquid phase, and hydrogen and water vapor in gas phase. Additional water is introduced to wash the salt deposits that are formed upon condensation of water. The two-phase cooled stream 111 is cooled further in air cooler 110b to condense all water. Water, organic liquid, and hydrogen-rich vapor are separated in a three-phase separator drum 112.

With the fatty acids converted in the first stage HDO reactor 108, the metals not trapped in the catalyst are expected to be removed with the drum 112 by water stream 113c. A hydrogen rich vapor phase 113a from drum 112 is recycled to the HDO reactors 108 and 116. A partially hydrodeoxygenated liquid 113b is combined with recycled hydrogen 135. A combined stream 114 is heated in the heat exchanger 110a before entering a second stage HDO reactor 116 at about 550° F. Since the fatty acids were converted in reactor 108, the heat exchanger 110a and the second stage HDO reactor 116 need not be designed for acid service. The remaining oxygen atoms in the fatty alcohol and diester intermediate are removed via hydrogenolysis over a bimetallic catalyst, such as sulfided NiMo on alumina in the second stage HDO reactor 116 (Equations (5) and (6)). Other catalysts suitable for use in reactor 116 include sulfided CoMo and NiMo on supports such as alumina, aluminum phosphate, silica, or combinations thereof.

Effluent 117 is cooled in the heat exchanger 105. A cooled stream 118 contains n-paraffins in liquid phase, and water, hydrogen, and propane in vapor phase. Liquid and vapor are separated in a drum 119. A vapor stream 120a is cooled in an air cooler 122 to condense the light hydrocarbons (including propane) and water. A three-phase stream 123 is separated in a drum 124 into a hydrogen-rich vapor stream 125a, a paraffin product stream 125b, and water 125c. The water 125c is combined with HDO water 113c from reactor 108 and sent to offsite water treatment for use or disposal. Paraffin product streams 120b and 125b may be combined into a single stream 126. The n-paraffins in stream 126 may be hydroisomerized to isoparaffinic diesel and/or hydrocracked to isoparaffinic kerosene jet fuel. The LPG and naphtha co-products may then be separated. A fixed-bed reactor similar to the HDO reactors described herein may be used for hydroisomerization/hydrocracking. Suitable catalysts include Group VIIIB metals such as platinum, palladium, and nickel on amorphous or crystalline supports such as alumina, fluorided alumina, silica, ferrierite, ZSM-12, ZSM-21, SAPO-11, and SAPO-31.

The desired hydrogen concentration in a recycle treat gas 133 may be reached by purging (stream 127) some of the recycle hydrogen and replacing that with makeup hydrogen (stream 132). To reduce the purge/recycle ratio, hydrogen-rich vapors 121 may be processed through a purification unit 129. Impurities such as hydrogen sulfide, ammonia, carbon dioxide, and carbon monoxide present in recycle treat gas 128 are thus removed in unit 129 to provide high purity hydrogen treat gas 130 for HDO reaction. Scrubbers (absorption columns) are commonly used for this application. Makeup hydrogen gas 132 is pressurized in compressor 131a and combined with treat gas 130 in recycle compressor 131b to provide the treat gas for the HDO reactors 108 and 116.

Figure 2:
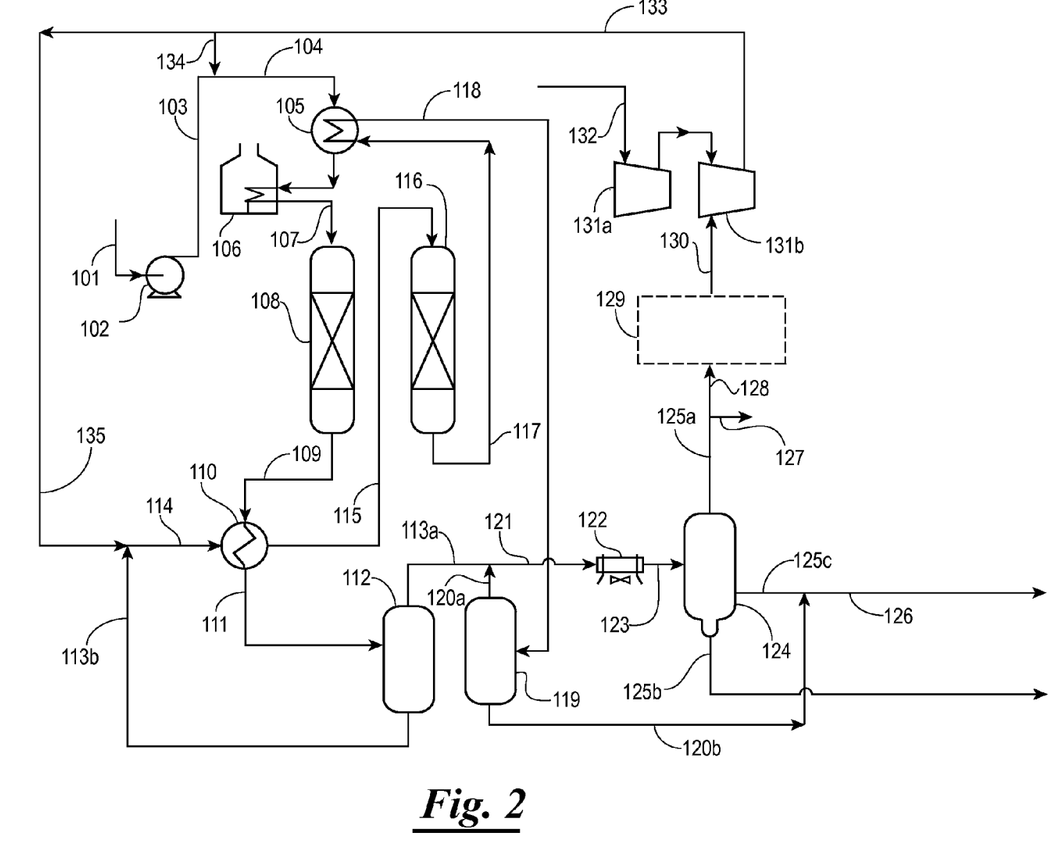
FIG. 2 is a schematic diagram showing an alternative embodiment of a hydrodeoxygenation process according to the present invention.

Referring to FIG. 2, shown therein is another embodiment of the operation of the process generally in accordance with the invention as described herein except that the water from the first stage HDO reactor 108 is not recovered as a liquid effluent. Instead, water vapors from both HDO reactors 108 and 116 are combined as vapor stream 121 for condensing in the single air cooler 122. Although a lower capital cost embodiment, the water soluble salts are not removed with inter-stage water effluent. Modifications may be made to the two-stage HDO process to account for changes in feed quality as shown in FIG. 2. For example, if the feed is deficient in organic sulfur, a sulfur agent must be introduced to keep the catalysts in the sulfide state. As another example, hydrogen quench may be employed to reduce the temperature rise across each bed. Additionally, removal of water between the two reaction stages provides an effective means of removing reaction heat and decreases water partial pressure (and increases the hydrogen partial pressure), which is known to increase catalyst stability. It should be understood by one of ordinary skill in the art that such modifications are within the spirit of the inventive two-stage HDO process.

The two-step HDO process solves other process needs not met by a single-stage adiabatic fixed-bed reactor typically used in the prior art. The two-step process provides an effective way of removing heat from the exothermic HDO conversion, reduces water partial pressure, and prevents contaminants from deactivating/plugging the high activity catalyst bed. Furthermore, by selectively converting the free fatty acids in the first stage HDO reactor 108, the corrosive load on the second stage HDO reactor 116 and catalyst is eliminated.

Phosphorus from the HDO process may be removed and recovered for reuse. It should be understood by one of ordinary skill in the art that phosphorus may be removed by any process used to convert fats, oils, and greases to biofuels and/or bio-based chemicals in accordance with the present invention as described herein.

Figure 3:
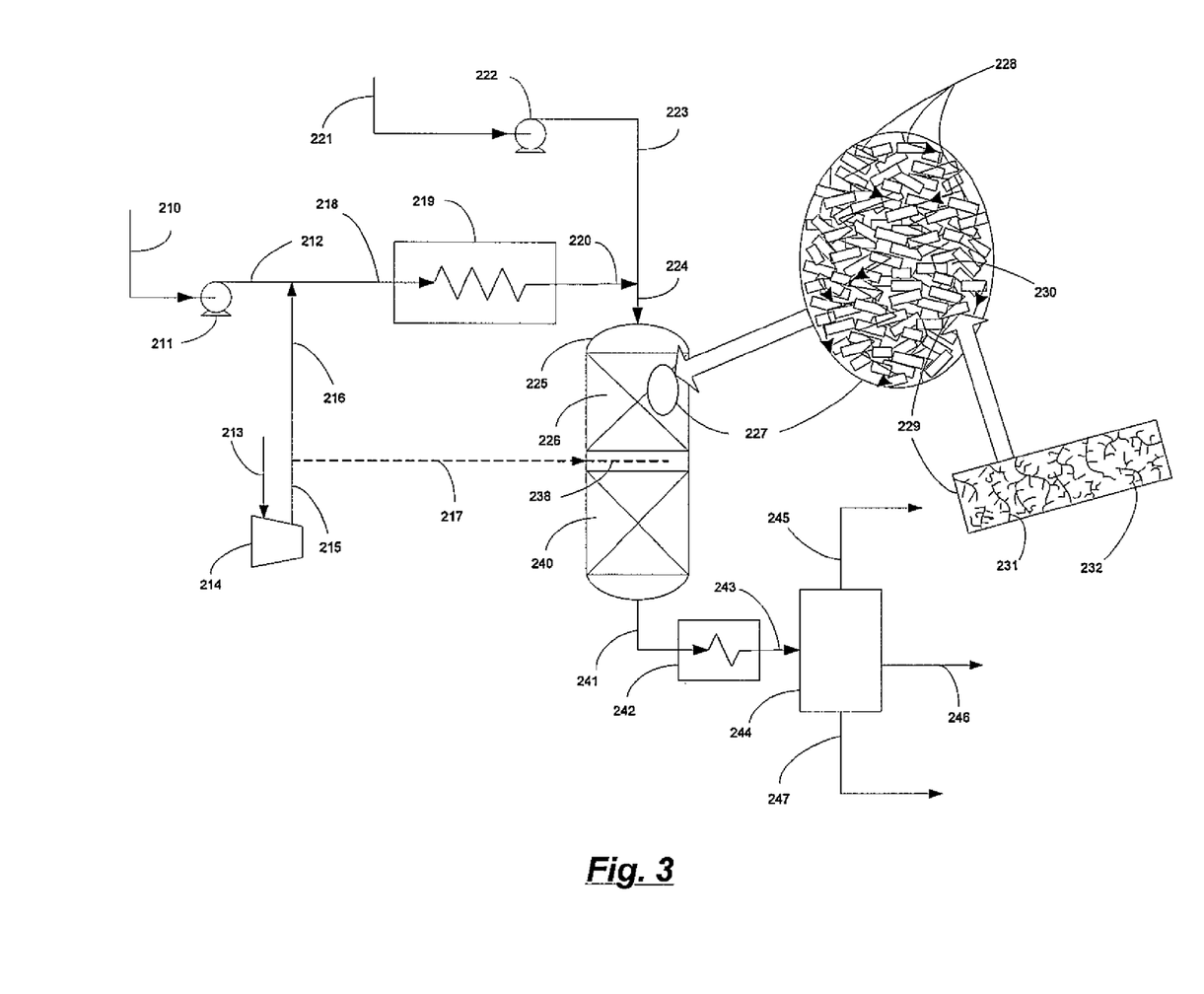
FIG. 3 is a schematic diagram of an operation of a process for removing and capturing phosphorus present in fats, oils, and greases, while producing biofuels and/or bio-based chemical products/intermediates according to the present invention.

Referring now to FIG. 3, shown therein is a schematic of the operation of the process in accordance with an embodiment of the present invention as described herein. Feed 221 including fats, oils, and greases (abbreviated as FOG), is provided for biofuel production and phosphorus recovery. Examples of plant based oils include vegetable oils, such as soybean oil, canola oil, and rapeseed oils, as well as palm oil, palm kernel oil, jatropha oil, castor oil, camelina oil, algae oil, seaweed oil, and oils from halophiles. These may be classified as crude, degummed, and RBD grade, depending on level of pretreatment and phosphorus content. The phosphorus in plant oils, as encompassed in this invention, thus ranges from about 1 wppm to about 1,000 wppm, preferably from about 10 wppm to about 100 wppm.

Examples of fats include inedible tallow, edible tallow, technical tallow, floatation tallow, lard, poultry fat/oils, and fish oils. Depending on the rendering operation used for separating fat from the slaughtered animal's protein-rich fractions, phosphorus in the animal fats may be from about 10 wppm to about 800 wppm.

Examples of greases include yellow grease, brown grease, waste vegetable oils, restaurant greases, trap grease from municipalities such as water treatment facilities, and spent oils from industrial packaged food operations. Phosphorus in greases is typically between about 1 wppm to about 500 wppm.

FOG includes free fatty acids, glycerides, and a few percent unsaponifiable matter (which typically includes sterols, chlorophyll, proteins, and aldehydes, but also pesticides, polymers, and fat oxidation/decomposition products). Metals, mainly sodium, potassium, calcium, magnesium, and iron are also present in FOG with the total concentration between about 1 wppm to about 1,000 wppm for all fats, oils, and greases. Polyethylene, e.g. from plastic film packaging, is an example of a synthetic polymer that may be present in fats.

Depending on the degree of fatty acid unsaturation (average number of double bonds per fatty acid), FOG may be a liquid, a slushy liquid, a semi-solid, or a soft waxy solid at ambient temperature. To ensure a low viscosity liquid state for processing, FOG feed 221 is stored at temperatures between about 140° F. to about 240° F.

In a preferred embodiment, FOG feed 221 undergoes filtration to remove solids prior to introduction into the process of the present invention as described herein. Examples of filtered solids include polymers with melting points above FOG storage temperatures, and phosphorus-rich solids. The phosphorus-rich solids include the undigested grain and hay eaten by the animal that was in the animal's intestines at the time of slaughter and are present in the rendered fat. Such solids may be recovered for use as natural fertilizer. Filtration is preferably performed using a plurality of filters to extend time between filer cleanings or change-outs. In a preferred embodiment, the filters are staged according to micron retention, such that coarse (1+ mm), intermediate (100 micron to 1 mm), fine (10 micron to 100 micron), and very fine (1 micron to 10 micron) solids are removed in subsequent filtration stages.

FOG feed 221 as described herein is pressurized to from about 400 psig to about 4,000 psig, preferably from about 500 psig to about 2,000 psig, using a pump 222.

A reaction solvent or diluent 210 is pressurized to the same pressure using a different pump 211. The solvent is preferably a hydrocarbon which does not have to be separated from the final product. The solvent may be petroleum-based, coal-based, natural gas-based, or bio-based. In a preferred embodiment, the solvent is the final product (hydrocarbon stream 246) that is partially recycled for use as the reaction solvent. The pressurized solvent 212 is combined with a hydrogen-rich gas 213.

The hydrogen-rich gas 213 is at least 70 mol % $H_2$, preferably at least 80 mol % $H_2$. The impurities in the hydrogen-rich gas 213 are typically light hydrocarbons and byproducts of FOG hydrodeoxygenation such as water, CO, $CO_2$, $H_2S$, and $NH_3$ and thus, present when hydrogen-rich gas 213 includes recycle gas from the reactor 225.

Hydrogen-rich gas 213 is pressurized to the preferred pressure range of between about 500 psig to about 2,000 psig in compressor 214. The compressed hydrogen-rich gas 215/216 is then combined with the pressurized solvent 212 and transferred to a pre-heater system 219 via conduit 218. The two-phase fluid from conduit 218 is heated in the preheater system 219 to a temperature between about 500° F. and about 800° F., preferably between about 600° F. and about 750° F. In alternate embodiments of the present invention, the solvent 212 is heated in preheater 219 before injection of compressed hydrogen 216. The preheater system 219 may be two heat exchangers in series, the first heater cross-exchanging with reactor effluent 241 for heating (and recovering some of the heat of the exothermic reaction) and the tail heater using heat exchange with hot oil or steam to reach the target temperature range. Alternatively, part or all of the duty for the preheater system 219 may be provided by a fired heater.

A preheated mixed phase stream 220 containing solvent 212 and hydrogen 215/216 is then mixed with the pressurized FOG feed 223 to form the dissolved/diluted reactor feed stream 224. Since the FOG feed 223 is stored at relatively low temperatures—typically between about 140° F. to about 240° F.—it is the solvent 212 that provides the heat for achieving the target reactor temperatures. The dissolved/diluted FOG stream 224, i.e. the reactor feed, is preferably between about 400° F. to about 700° F., and most preferably between about 500° F. and about 650° F. To achieve the desired benefits of the invention disclosed herein, the ratio of solvent 212 to FOG feed 223 (solvent:FOG) is preferably from about 1:1 to about 10:1, most preferably between about 1.5:1 to about 5:1. By avoiding direct heating of the FOG feed 223, deposition and loss of phosphorous compounds in preheater tubes is prevented.

The diluted and preheated feed 224 is introduced into a fixed-bed reactor vessel 225 and contacted with a catalyst packing section 226. The catalyst packing section 226, or catalyst bed 226, includes a low hydrogenation activity catalyst 229. At the preferred conditions of between about 500° F. to about 700° F. average bed temperature and between about 500 psi to about 2000 psi $H_2$ partial pressure, the liquid hourly space velocity (LHSV) through the catalyst bed 226 is from about 0.5 to about 5 hr-1. The catalyst 229 includes a transition metal supported on an alumina- or a silica-based support material having high porosity. The metal is preferably a base metal, most preferably from the group including molybdenum, nickel, cobalt, and tungsten. The concentration of metal on the catalyst 229 is from about 1 to about 10 wt %, preferably between about 2 wt % to about 6 wt %. A preferred catalyst is a monometallic base metal catalyst, preferably molybdenum (Mo) or tungsten (W). An example of the preferred catalyst is 3% Mo on alumina support, wherein the molybdenum is in the sulfide form.

The catalyst 229 includes macro-pores 231 and micro-pores 232. Macro-pores are defined as pores having diameters greater than 300 Angstroms. Catalyst 229 has at least 10% macro-pore, preferably between about 20% and about 60% macro-pores. The total pore surface area of preferred catalysts, as measured by the hydrogen BET method, is between about 60 and about 300 $m^2/g$, preferably between about 100 $m^2/g$ and about 200 $m^2/g$.

The diluted and preheated feed 224/228 and hydrogen 216/230 travels through the pores to access the hydrogenation metal sites where the phosphorus compounds are converted, to hydrocarbon products, and fatty acid, fatty alcohol, ketones, and ester intermediates, leaving phosphorus trapped within the catalyst pores 231/232.

Reactor 225 is optionally equipped with plurality of catalyst beds, such as catalyst beds 226 and 240. The catalysts in the beds may be the same or different. A preferred embodiment utilizes a more active catalyst in the bottom bed(s), for example, catalysts having a higher concentration of Mo or W, or bimetallic catalysts such as NiMo and NiW. A hydrogen quench 217 may optionally be added between catalyst beds 226 and 240 to mitigate the adiabatic temperature rise due to exothermic hydrogenation reactions. A reactor weighted average bed temperature of between about 500° F. to about 700° F. under between about 500 psi and about 2000 psi $H_2$ pressure is achieved. The hydrogen quench 217 may be introduced through a quench box 238 for more efficient mixing.

A reactor effluent 241 is cooled through cooler 242. The reactor effluent 241 is between about 550° F. to about 750° F. and is cooled to condense reaction products for separation from unreacted hydrogen and non-condensable byproducts. The cooler 242 may use any number of relatively low temperature streams in the plant for heat exchange. In the aforementioned description of solvent heater 219, heat transfer from the reactor effluent 241 to conduit 218 was cited as an embodiment of the invention. Heat transfer fluid (e.g. in a hot oil system) may also be used to recover the heat from reactor effluent 241 for use in other services around the plant. In other embodiments, cooler 242 may be a heat recovery boiler to generate steam from the heat of reaction.

Cooled reactor effluent 243, including condensed and non-condensed hydrocarbons, $H_2$, water, CO, $CO_2$, $H_2S$, and $NH_3$, is separated in a three-phase separation system 244. The separation system 244 preferably includes hot and cold high pressure separators.

A vapor phase 245 includes light hydrocarbons (e.g. propane), hydrogen, and associated impurities ($H_2S$, CO, etc.). The light hydrocarbons and hydrogen impurities are partially purged before recycle of the hydrogen-rich gas to the compressor 214. The hydrocarbon stream 246 includes the mainly $C_{11}$-$C_{24}$ hydrocarbons produced by hydrodeoxygenation, decarboxylation, and hydrogenation of fatty acid/glycerides. The hydrocarbon stream 246 may be further hydroprocessed (e.g. hydroisomerization) to improve low temperature properties for use as renewable diesel or jet fuel, and/or fractionated for use as specialty fluids, solvents, or chemical products.

A water stream 247 includes water produced in the hydrodeoxygenation reactions and the water-soluble byproducts of the reaction. The latter includes $H_2S$, $CO_2$ and $NH_3$ which may exist as the electrolytes $HS^-$, $CO_3^{2-}$, $HCO_3^-$, and $NH^{4+}$ in water. The water does not include any of the phosphorus compounds and may undergo treatment via pH neutralization.

After decrease of reactor activity/performance below target operating levels, the spent catalyst 229 is removed. The run length between catalyst change-outs depends on catalyst stability, FOG poisons/foulants, and reactor operating conditions, and can range from a few weeks to over a year. Standard procedures for safe removal of spent catalyst from fixed-bed reactor are known to those skilled in the art, and include purging the catalyst bed with hydrogen, inert gas, and/or liquid solvent before discharge into drums and bins.

The catalyst 229 is then optionally transported off-site for regeneration or metals reclamation. The catalyst's phosphorus content at the end of run is between about 3 wt % to about 10 wt %. The catalyst regeneration process involves controlled pyrolysis of hydrocarbons and coke burn-off in a furnace. The phosphorus trapped within the pores is also distilled at these conditions and is condensed under water as white phosphorus ($P_4$). This method of phosphorus recovery is not very different from how phosphorus is obtained by reduction of phosphate rock with coke in an electric furnace—i.e. the conventional method of phosphorus production. $P_4$ is condensed under water to prevent potentially violent oxidation in air. Oxidation in a controlled manner produces phosphorus pentoxide which is used in fertilizers or hydrolyzed to form phosphoric acid.

In order to further illustrate the present invention, the following examples are given. However, it is to be understood that the examples are for illustrative purposes only and are not to be construed as limiting the scope of the subject invention.

EXAMPLES

Example 1

Two-Stage HDO Process

A blend of brown grease, yellow grease, poultry oil, floatation grease, and lard was prepared. The fatty acid profile of the blend is summarized in Table I. Additional properties, including free fatty acid and contaminants concentration, are listed in Table II under the heading "Feed."

TABLE I

| Fatty Acid Distribution of Feedstock (wt %) | |
|---|---|
| C12:0 | 0.1 |
| C14:0 | 0.9 |
| C15:0 | 0.1 |
| C16:0 | 21 |
| C17:0 | 0.3 |
| C18:0 | 8.5 |
| C20:0 | 0.6 |
| C22:0 | 0.1 |
| C14:1 | 0.2 |
| C15:1 | <0.1 |
| C16:1 | 4.4 |
| C17:1 | 0.1 |
| C18:1 | 42.4 |
| C18:2 | 19.2 |
| C18:3 | 1.1 |
| C20:1 | 0.8 |
| C20:2+ | 0.2 |

TABLE II

| Performance of First Stage HDO Reactor (Note a) | | | | |
|---|---|---|---|---|
| | | First Stage HDO Reactor Temp | | |
| | Feed | 500° F. | 600° F. | 650° F. |
| Product Analysis | | | | |
| Acid number(mg KOH/g) | 72.3 | 37.9 | 5.34 | 1.65 |
| % Unsaponifiables | 1.26 | 7.35 | 57.2 | 79.1 |
| % Free fatty acids | 38.05 | 19.95 | 2.81 | 0.87 |
| % Triglycerides (Note b) | 58.48 | 56.73 | 16.5 | 0.851 |
| ICP Analysis (wppm) | | | | |
| Iron | 142 | 42.7 | 25.1 | 26.5 |
| Phosphorus | 193 | 31.6 | 91.3 | 75.9 |
| Group I + II metals | 987 | 358 | 439 | 508 |
| Byproduct yields (wt %) | | | | |
| Water | — | 1.23 | 5.58 | 6.6 |
| CO | — | 0.23 | 0.45 | 0.72 |
| C02 | — | 0.0 | 0.15 | 0.70 |

Notes:
(a) All runs at 1600 psig pressure, 2 LHSV feed rate, and 7,500 scf/bbl gas-to-oil ratio
(b) GC retention time 22-25 min.

A 100 cc pilot plant reactor was filled with a bottom bed of low activity molybdenum oxide catalyst and a top bed of inerts. The bottom bed consisted of 28.2 g TK-709 catalyst from Haldor Topsoe (ground and sieved to −20+100 mesh size) and 37.8 g of inert glass beads (−70+100 mesh). The top bed was 19.2 g TK-30 alumina inert reactor topping media from Haldor Topsoe and 25.2 g glass beads.

The molybdenum catalyst was sulfided by dimethyl disulfide diluted in ultra-low sulfur diesel solvent. The maximum sulfiding temperature was 700° F., at which the reactor was held for 16 hours. The reactor was then cooled down to 400° F. with solvent still flowing. Liquid flow was at 2 LHSV (active catalyst basis) and hydrogen flow at 7,000-8,000 scf/bbl throughout this sulfiding and catalyst break-in period.

The feed was pumped through the reactor at 1600 psig $H_2$ pressure while temperature was ramped to target condition for the experiment. The test conditions and results are summarized in Table II.

The drop in acid number suggests conversion of free fatty acids starting below 500° F. and virtually complete at 650° F. The gas chromatogram (GC) of the reactor product stream indicated complete conversion of the triglyceride at 650° F. Further analysis using GC-MS, GC with a paraffin-olefin-alcohol standard, and FTIR spectroscopy confirmed that the products of triglyceride conversion were fatty alcohols and diesters.

The product of the 600° F. and the 650° F. conversion runs above were combined and used as feed to another 100 cc reactor. The reactor contained a NiMo catalyst and was sulfided according to the procedure described earlier in this example. Two runs at different temperatures and space velocities were conducted and are summarized in Table III.

TABLE III

Performance of Second Stage HDO Reactor (Notes a, b)

|  | Run 1 | Run 2 |
|---|---|---|
| LHSV (hr$^{-1}$) | 3 | 1.5 |
| WABT (F.) | 680 | 700 |
| gas-to-oil ratio (scf/bbl) | 16,000 | 10,000 |
| Specific gravity | 0.805 | 0.795 |
| Water yield (wt %) | 4.6 | 7.8 |

Notes:
(a) Reactor feed composite of first stage HDO reactor from 600 and 650 F. (see Table I)
(b) Both runs at 1600 psig pressure Run 2 resulted in complete conversion to n-paraffins, as suggested by specific gravity and GC. The HDO efficiency was calculated by ratio of n-$C_{18}$ to sum of n-$C_{17}$ and n-$C_{18}$. (Since there is very little $C_{17}$ fatty acid in the triglyceride/fatty acid feedstock, all n-$C_{17}$ must be formed via DCO.) The HDO efficiency was thus calculated to be 80%.

Example 2

One-Stage HDO Process

A 100 cc isothermal tubular reactor was filled with 80 cc of NiMo-on-alumina catalyst pellets (commercial catalyst from Catalyst Trading Company, Ltd., Houston) and +70-100 mesh glass beads. The catalyst had the same $MoO_3$/NiO loading and surface area as the NiMo catalyst of Example 1 and was sulfided according to the method described therein. The reactor was operated at 700° F. and 1,200-1,600 psig $H_2$ pressure with both vegetable oils and animal fat feeds. The feed flow rate was 1 LHSV (active catalyst basis), with about 10,000 scf/bbl $H_2$-to-feed ratio. The n-paraffin products obtained were analyzed by GC and the HDO efficiency was calculated according to the method described in Example 1. The HDO efficiencies were 63% for tallow (beef fat), 58% for palm oil, and 66% for canola oil.

Example 3

Conversion of Phosphorus-Containing Fats and Oils

A FOG blend with inedible tallow as its main component was processed through a two-bed HDO reactor system operated according to the preferred conditions specified herein. A sulfided catalyst with 3% molybdenum on alumina was used in the first reactor bed, and a commercial NiMo catalyst in the second reactor bed. The FOG blend phosphorus content was measured using inductively coupled plasma—optical emission spectroscopy (ICP-OES) analysis and was found to contain between 10 wppm and 50 wppm P during most of the run. After two months on stream, the reactor was shut down and samples of spent catalyst from the first reactor bed were obtained for analysis. The spent catalyst from the top of the bed was found to contain 9.9 wt % phosphorus.

The HDO product was a paraffinic hydrocarbon composition, mainly in the $C_{11}$-$C_{24}$ range, with no detectable oxygenates. No change in HDO product properties was noted during the run period. The HDO product was converted to renewable diesel and jet fuel via hydroisomerization and hydrocracking, according to conditions specified in prior art, specifically, U.S. Pat. Nos. 7,846,323 and 7,968,757. The diesel product had a cloud point less than −10° C. and conformed to ASTM D975 for conventional diesel. The jet fuel product met all ASTM D7566 specifications for synthetic aviation turbine fuel. These hydrocarbon fuel products had no detectable metals or phosphorus.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A method for producing hydrocarbons from biomass, comprising the steps of:
    providing a feed stream containing biomass having fatty acids, mono-, di-, and/or triglycerides, and a phosphorus content of about 1 wppm to about 1,000 wppm, at a temperature from about 140° F. to about 240° F.;
    providing a heated hydrocarbon solvent at a temperature from about 500° F. to about 800° F.;
    providing a hydrogen-rich gas;
    removing phosphorus and producing hydrocarbons by combining the feed stream, the heated hydrocarbon solvent, and the hydrogen-rich gas to generate a reactor feed and contacting the reactor feed with a low activity hydrogenation catalyst, where the reactor feed is at a temperature from about 400° F. to about 700° F.; and
    recovering a spent low activity hydrogenation catalyst at the end of run wherein the spent low activity hydrogenation catalyst contains between about 3% and about 10% by weight phosphorus;
    wherein
        the low activity hydrogenation catalyst is in a reactor; and
        the heated hydrocarbon solvent provides the heat for achieving the reactor feed temperature and the reactor temperature.

2. The method of claim 1 wherein the feed stream is selected from the group comprising animal fats, poultry oil, soybean oil, canola oil, rapeseed oils, palm oil, palm kernel oil, jatropha oil, castor oil, camelina oil, algae oil, seaweed oil, halophile oils, rendered fats, restaurant greases, brown grease, yellow grease, waste industrial frying oils, fish oils, and tall oil.

3. The method of claim 1 wherein the low activity hydrogenation catalyst is a sulfided mono-metallic base metal catalyst.

4. The method of claim 3 wherein the low activity hydrogenation catalyst contains between about 2% and about 10% by weight molybdenum or tungsten.

5. The method of claim 1 wherein the spent low activity hydrogenation catalyst contains between about 6% and about 10% phosphorus by weight.

6. The method of claim 1 wherein the spent low activity hydrogenation catalyst contains between about 9% and about 10% phosphorus by weight.

7. The method of claim 1 wherein the product of the step of combining the feed stream, the heated hydrocarbon solvent, and the hydrogen-rich gas in the presence of a low activity hydrogenation catalyst is further reacted in the presence of a high activity hydrogenation catalyst.

8. The method of claim 7 wherein the high activity hydrogenation catalyst is a bimetallic base metal catalyst.

9. The method of claim 8 wherein the high activity hydrogenation catalyst contains at least 16% total metals from the group comprising nickel, cobalt, molybdenum, and tungsten.

10. The method of claim 1 wherein phosphorus is recovered from the spent low activity hydrogenation catalyst.

11. The method of claim 10 wherein the phosphorus is recovered in a furnace under catalyst decoking conditions.

12. The method of claim 11 wherein the low activity hydrogenation catalyst is regenerated and reused after phosphorus recovery and catalyst decoking.

13. The method of claim 1 wherein the hydrocarbons comprise n-paraffins in the $C_{11}$ to $C_{24}$ range.

14. The method of claim 1 wherein the hydrocarbons are hydroisomerized.

15. The method of claim 14 wherein the hydroisomerized hydrocarbons comprise renewable diesel.

16. The method of claim 1 wherein the hydrocarbons are fractionated into products comprising chemical intermediates, fluids, and solvents.

17. The method of claim 1 wherein the heated hydrocarbon solvent is between about 550° F. to about 750° F.

18. The method of claim 1 wherein the heated hydrocarbon solvent is provided from the hydrocarbons produced from biomass.

19. The method of claim 1 wherein the phosphorus content of the biomass is about 10 wppm to about 1,000 wppm.

20. The method of claim 1 wherein the phosphorus content of the biomass is about 1 wppm to about 500 wppm.

21. A method for producing hydrocarbons from biomass, comprising the steps of:

providing a feed stream containing biomass having fatty acids, mono-, di-, and/or triglycerides, and a phosphorus content of about 1 wppm to about 1,000 wppm, at a temperature from about 140° F. to about 240° F.;

providing a heated hydrocarbon solvent at a temperature from about 500° F. to about 800° F.;

providing a hydrogen-rich gas;

removing phosphorus and producing hydrocarbons by combining the feed stream, the heated hydrocarbon solvent, and the hydrogen-rich gas to generate a reactor feed and contacting the reactor feed with a low activity hydrogenation catalyst, where the reactor feed is at a temperature from about 400° F. to about 700° F.; and recovering-a spent low activity hydrogenation catalyst at the end of run wherein the spent low activity hydrogenation catalyst contains between about 3% and about 10% by weight phosphorus;

wherein
the low activity hydrogenation catalyst contains between about 2% and about 10% by weight molybdenum or tungsten;
the low activity hydrogenation catalyst is in a reactor;
the reactor is at a temperature from about 400° F. to about 700° F.; and
the heated hydrocarbon solvent provides the heat for achieving the reactor feed temperature and the reactor temperature.

22. A method for producing hydrocarbons from biomass, comprising the steps of:

providing a feed stream containing biomass having fatty acids, mono-, di-, and/or triglycerides, and a phosphorus content of about 1 wppm to about 1,000 wppm;

providing a heated hydrocarbon solvent;

providing a hydrogen-rich gas;

removing phosphorus and producing hydrocarbons by combining the feed stream, the heated hydrocarbon solvent, and the hydrogen-rich gas to generate a reactor feed and contacting the reactor feed with a low activity hydrogenation catalyst; and recovering-the low activity hydrogenation catalyst at the end of run wherein the low activity hydrogenation catalyst contains between about 3% and about 10% by weight phosphorus;

wherein
the low activity hydrogenation catalyst contains between about 2% and about 10% by weight molybdenum or tungsten;
the low activity hydrogenation catalyst is in a reactor;
the reactor is at a temperature from about 400° F. to about 700° F.; and
the heated hydrocarbon solvent provides the heat for achieving the reactor feed temperature and the reactor temperature.

* * * * *